United States Patent
Tones et al.

(10) Patent No.: US 12,392,413 B2
(45) Date of Patent: Aug. 19, 2025

(54) 3D SEAL ASSEMBLY

(71) Applicant: Garlock Sealing Technologies, LLC, Palmyra, NY (US)

(72) Inventors: Kristopher Tones, Palmyra, NY (US); Jeffrey Blank, Palmyra, NY (US); Joshua Cavinee, Palmyra, NY (US)

(73) Assignee: GARLOCK SEALING TECHNOLOGIES LLC, Palmyra, NY (US)

(*) Notice: Subject to any disclaimer, the term of this patent is extended or adjusted under 35 U.S.C. 154(b) by 0 days.

(21) Appl. No.: 17/969,401

(22) Filed: Oct. 19, 2022

(65) Prior Publication Data
US 2023/0044803 A1 Feb. 9, 2023

Related U.S. Application Data

(63) Continuation of application No. PCT/US2021/031116, filed on May 6, 2021.

(60) Provisional application No. 63/021,331, filed on May 7, 2020, provisional application No. 63/078,771, filed on Sep. 15, 2020.

(51) Int. Cl.
*F16J 15/52* (2006.01)
*F16J 15/54* (2006.01)

(52) U.S. Cl.
CPC .............. *F16J 15/52* (2013.01); *F16J 15/54* (2013.01)

(58) Field of Classification Search
CPC ......... F16J 15/52; F16J 15/54; F16J 15/3204; F16J 15/3232; F16J 15/3248
See application file for complete search history.

(56) References Cited

U.S. PATENT DOCUMENTS

| | | | | |
|---|---|---|---|---|
| 4,443,015 A | * | 4/1984 | Duffee | F16J 15/54 277/374 |
| 6,328,312 B1 | * | 12/2001 | Schmitz | F16C 33/76 277/916 |
| 2002/0153664 A1 | * | 10/2002 | Schroeder | F16J 15/56 277/551 |

(Continued)

FOREIGN PATENT DOCUMENTS

| | | |
|---|---|---|
| CN | 202194855 U | 4/2012 |
| KR | 20-0229077 Y1 | 7/2001 |

OTHER PUBLICATIONS

PCT/US2021/031116 International Search Report and Written Opinion mailed Aug. 12, 2021, 11 pgs. total.

*Primary Examiner* — Gilbert Y Lee
(74) *Attorney, Agent, or Firm* — Husch Blackwell LLP

(57) ABSTRACT

A 3D seal assembly is provided. The 3D seal assembly includes a rotational assembly and a stationary assembly for high misalignment operating environments. The rotational assembly includes a sleeve and a collar coupled together. The stationary assembly includes a housing with a recess on a radially inward side of the housing. A lip seal assembly, sized to fit within the recess, comprises at least one elastomeric seal element and spacer. At least one elastomeric seal element has a radially extending portion that engages the stationary assembly housing and an axially extending portion that engages with a running surface on the radially outer surface of the rotational assembly. A retention plate is coupled to the stationary assembly housing with a compression fastener. The assembly using compression fasteners allows for field disassembly and repair.

11 Claims, 4 Drawing Sheets

(56) References Cited

U.S. PATENT DOCUMENTS

| | | |
|---|---|---|
| 2005/0134002 A1 | 6/2005 | Elliott et al. |
| 2007/0222162 A1* | 9/2007 | Stoner .................... F16J 15/166 |
| | | 277/589 |
| 2008/0136114 A1* | 6/2008 | Lokhandwalla ....... H02K 5/124 |
| | | 277/392 |
| 2012/0099984 A1 | 4/2012 | Abarca Melo et al. |
| 2017/0299061 A1 | 10/2017 | Rhee |
| 2019/0078569 A1 | 3/2019 | Vasagar |

* cited by examiner

3D SEAL ASSEMBLY

CROSS-REFERENCE TO RELATED PATENT APPLICATIONS

The application is related to and, to the extent possible, is a continuation of international application PCT/US2021/031116, filed May 6, 2021, which designates the United States of America, and claims priority to U.S. Provisional patent application Ser. No. 63/021,331, filed May 7, 2020 and U.S. Provisional patent application Ser. No. 63/078,771, filed Sep. 15, 2020, the disclosures of which are all incorporated herein for all purposes as if set out in full.

BACKGROUND

The technology of the present application relates to a 3D seal design. More particularly, the 3D seal assembly relates to a retention device and/or gland to facilitate the installation, replacement, and repair of a 3D seal.

A 3D seal design generally relates to a seal assembly, that is comprised of multiple static and dynamic sealing interfaces, wherein the dynamic seals may have to survive significant radial and/or axial misalignment. Exemplary uses of a 3D seal generally relate to seals for agitators and/or mixers. Thus, the 3D seal assembly is often referred to as a 3D mixer seal or 3D mixer seal assembly.

Conventionally, 3D seals are complex and often customized for a particular application. Moreover, conventional 3D seal assemblies are difficult to repair or replace without completely disassembling the 3D seal assemblies, often utilizing specialized equipment.

Thus, against this background, it would be desirable to provide an improved 3D seal assembly including an updated 3D seal housing to address these and other deficiencies with conventional 3D seals.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a 3D seal assembly is provided. The 3D seal assembly includes a rotating subassembly and a stationary sub-assembly. The rotating assembly typically includes a sleeve, a collar, and necessary elastomeric components coupled to rotate together. The stationary sub-assembly includes an inboard housing with a recess on a radially media-facing side. An annular lip seal assembly includes one static seal and the necessary spacer(s) sized to fit within the recess. The elastomeric element within the lip seal assembly is comprised of a radial contacted section that creates the static seal, and an axial section, that is common to the rotating running surface to create the dynamic seal. A retention plate is coupled to the housing with a compression fastener and applies compression to the lip seal assembly.

In some embodiments, a bearing is provided to allow rotation between the rotating sub-assembly and the stationary sub-assembly, while specifically maintaining the positional relationship between the rotating components and the stationary components. The seal assembly incorporates a bearing isolator to inhibit debris and fluid from fouling the lubrication of the bearing.

In some embodiments, the lip seal assembly includes a plurality of seal elements. The plurality of seal elements are separated by a plurality of spacers. The seal elements may have axially extending portions extending all in an axially outward direction, an axially inward direction, in axially alternative directions, or a combination thereof.

In some embodiments, the 3D seal assembly comprises an expansion joint coupled to an inboard housing.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a 3D mixer seal assembly for a mixer and/or agitator. However, the technology described herein may be used with applications other than those specifically described herein. For example, the technology of the present application may be applicable to any shaft seal assembly having a relatively high misalignment and run out. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
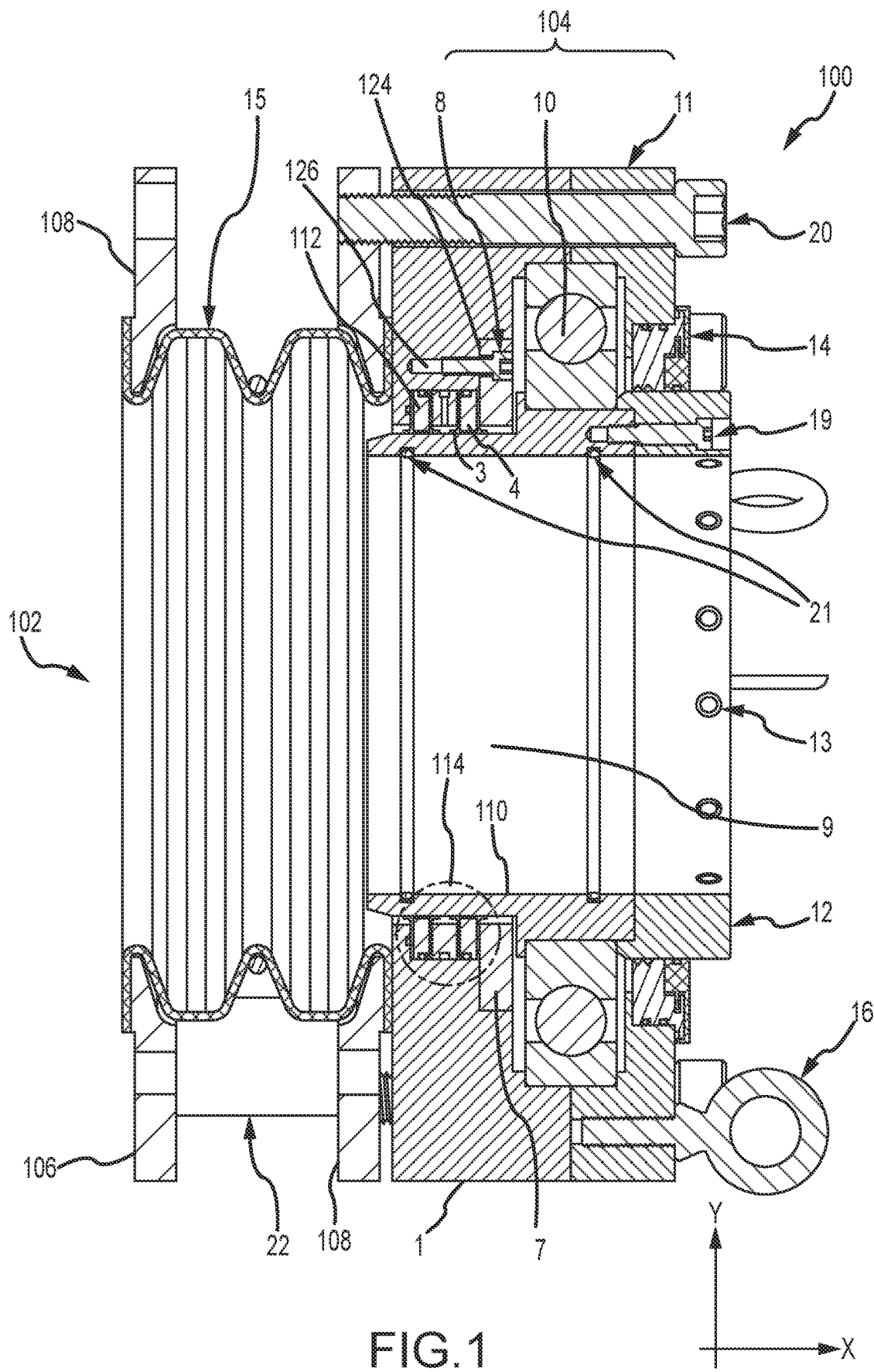
FIG. 1 shows a cross-sectional view of a 3D seal assembly consistent with the technology of the application.

With reference now to FIG. 1, a 3D seal assembly 100 (sometimes referred to as seal assembly 100, seal 100, or assembly 100) is shown in cross-section. For reference, parts of the seal assembly 100 may be described having an axial or radial extension/direction. Axial generally means along the x axis or horizontally across the drawing and radial generally means along the y axis or vertically across the drawing. Although axial and radial should not be considered limiting unless required by the context of the description.

The seal assembly 100 has an axially extending bore 102 sized to receive a shaft (not specifically shown) that rotates or oscillates within the bore. The seal assembly includes a housing assembly 104. The housing assembly 104 has an inboard housing 1 coupled to an outboard housing 11 although in certain embodiments the housing assembly 104 may be formed as a monolithic unit. An expansion joint assembly 106 is coupled to the inboard housing 1 The expansion joint 106 includes a bellows 15 having flanged connection plates 108 on opposing sides of the bellows 15. The outboard housing 11, inboard housing 1 and flanged connection plates 108 have aligned bores to receive a fastener 20. The bores may be threaded in which case fastener 20 may be a screw. In other embodiments, the fastener 20 may be a nut and bolt, a rivet, or the like. The bellows 15 may be a metal bellows or an elastomeric bellows. The expansion joint 106 is coupled to a mixer or the like (not shown) by one of the flanged connection plates 108. The expansion joint 106 allows for radial misalignment between the seal mounting bolt circle axis located on the vessel wall and the shaft axis common to the seal location. The expansion joint 106 also allows for axial misalignment due to relative axial motion between the shaft-seal location and the vessel wall.

The inner diameter of the bore in the seal assembly 100 is formed by the inner surface of a sleeve 9 on the inboard side of the seal assembly 100 and an inner surface of a collar 12 on the outboard side of the seal assembly 100. The collar 12 is couple to the sleeve by a plurality of fasteners 19, such as a shoulder screw, pin, or the like. The inner surface 110 of the sleeve 9 may have one or more grooves or recesses to receive an elastomeric sealing element 21, such as a conventional O-Ring. The elastomeric sealing element 21 inhibits leakage along the shaft between the shaft and the sleeve 9. The collar 12 includes a plurality of bores to receive fasteners 13, which may be set screws of the like. The set screws 13 couple the collar 12 to the shaft such that the collar 12, sleeve 9, and shaft rotate together, thus forming the previously mentioned "rotational sub assembly".

Figure 2:
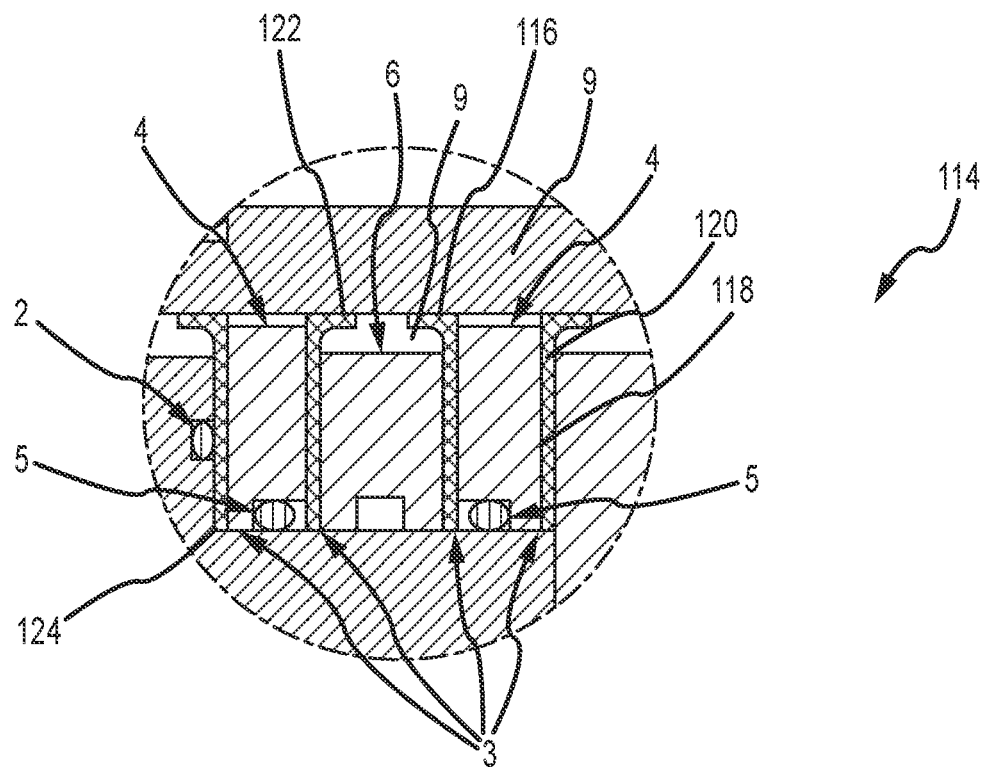
FIG. 2 shows a cross-sectional view of a 3D seal assembly of the 3D seal assembly of FIG. 1 in additional detail.

A bearing 10, such as a ball bearing including a cup and a race, allows for rotation between the sleeve 9 and collar 12 (forming the rotating sub-assembly) and the housing 104 (forming the stationary sub-assembly), while specifically maintaining the positional relationship between the rotating components and the stationary components. The inboard housing 1 includes a recess 112 at a radially inner side of the inboard housing 1. The recess 112 contains a lip seal assembly 114, which is shown in detail C (FIG. 2). The lip seal assembly inhibits leakage between the rotor, which includes the sleeve 9 and collar 12 and the stator, which includes the housing 104.

FIG. 2 shows detail C of an exemplary lip seal assembly 114. The lip seal assembly 114 includes a plurality of seal elements 3. Additional seal elements are disclosed in U.S. patent application Ser. No. 16/005,996, titled Multi-Layered PTFE Radial Lip Seal, which is incorporated herein by reference as if set out in full. Each of the seal elements 3 have an axially extending portion 116 abutting the outer surface of the sleeve 9 and a radially extending portion 118 coupled by a bend or elbow portion 120. The seal elements 3 may be formed from a polytetrafluoroethylene (PTFE), rubber, Silicone, other fluoropolymers, combinations thereof, or the like. The PTFE may be non-porous PTFE, full density PTFE, or the like in certain embodiments. The seal elements form a generally L or J shape. U.S. patent application Ser. No. 16/005,996, incorporated above, discloses alternative composite seal elements. The axially extending portion 116 may extend alternatively in an inboard direction and an outboard direction, all in the same direction (all inboard or all outboard), or in other combinations.

Interspersed between each of the plurality of seal elements 3 are a plurality of spacers 4 and 6. In an exemplary design, the spacers are formed from glass filled PTFE, however the spacers made be made from any combination of metals, polymers, and elastomers. The spacers may be configured to incorporate circumferential flow paths to allow for flush media to be circulated through the seal. The flush media will be application dependent, but is most commonly steam, pressurized air, or clean water. Flush media is applied to the seal assembly in those cases where the process media is hazardous, abrasive, or difficult to seal without environmental controls. The spacers are sized to align with the radially extend portion 118 of the seal elements 3. A gap g exists between the spacers 4 and 6 and the sleeve 9. The bend or elbow portion 120 of the seal elements 3 begins radially inwardly of the spacers 4. The bend portion 120 transitions to an axially extending portion 116 that runs on a running surface 122 on the sleeve 9.

The inboard housing may have a groove in the radially extending wall 124 of the recess 112 that receives an elastomeric seal element 2, such as an o-ring. The spacers 4 also may have grooves in the axially extending walls abutting an axially extending wall of the recess 112. The grooves also may receive an elastomeric seal element 5.

With reference back to FIG. 1, the lip seal assembly 114, comprising a plurality of seal elements 3 with spacers 4 interspersed there between, is held in compression by a retention plate 7 or retention ring 7. A compression fastener 8, such as for example, a socket head cap screw, is threaded through a bore 124 on the retention ring 7 and into a threaded bore 126 on the inboard housing 1.

The seal assembly 100 is formed/assembled onto the shaft (not specifically shown) of a mixer or agitator To form the seal assembly 100 on the shaft, in one exemplary methodology, an elastomeric seal, such as an o-ring, is placed in the groove on the radially extending wall 124 in the recess 112 of the inboard housing 1. O-rings, or the like, are similarly placed in the grooves of the axially inner most spacer 4 and the axially outer most spacer 4. The lip seal assembly 114 is put together and placed into the recess 112. The retaining ring 7 is placed and compression fastener 8 is tightened to provide the desired compression on the lip seal assembly 114.

Next, the bearing 10 is placed onto the sleeve 9 and seated. The fasteners 13 are fitted to the collar 12 until the bottoms of the fasteners 13 are flush with an inner surface of the collar 12. The collar 12 is mated with the sleeve 9 and the fastener(s) 19 are threaded to couple the sleeve, bearing, and collar.

Next, a spacer is placed between the opposed flanged connection plates of the expansion joint 106. The inboard housing 1 is placed on one of the flanged connection plates such that their bores align. The sleeve 9, bearing 10, and collar 12 are oriented in the inboard housing 1, and the outboard housing 11 is placed over the inboard housing 1, sleeve 9, bearing 10, and collar 12 with the connection bores aligning with the connection bore of the inboard housing. Fasteners 20 are installed to couple the seal assembly 100 together.

Finally, the bearing isolator 14 is installed. The bearing isolator 14 inhibits fluids, such as water, and debris from fouling the grease of the bearing, which reduces wear and increases the life of the bearing 10.

As can now be appreciated, the lip seal assembly 114 is accessible without removing the entire assembly from the media vessel of the mixer or agitator. The outer housing 11 needs to be removed along with the bearing isolator 1. The rotating sub-assembly, comprised of the sleeve, bearing, and collar is then removed from the shaft. Once the rotating sub-assembly is removed, the compression fastener 8 may be backed off and the retaining plate 7 may be removed. Removal of the retaining plate allows the lip seal assembly 114 to be accessed and rebuilt as required for repair.

Figure 3:
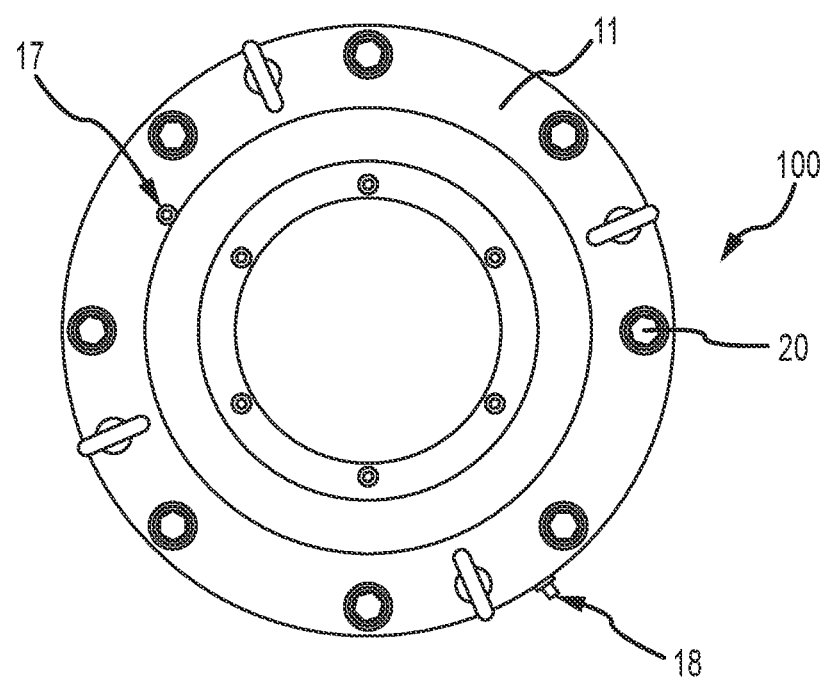
FIG. 3 shows an elevation view of the outboard side of the 3D seal assembly of FIG. 1.

FIG. 3 shows an elevation view of the 3D seal assembly 100 viewed from the outboard housing 11. The heads of the fasteners 20 are shown symmetrically spaced around the outboard housing 11. A plug 17 and a grease fitting 18 are shown. The grease fitting 18 allows for injecting grease to the bearing 10. The plug 17 seals the connection to the aforementioned flush passages internal to the seal. In applications wherein flush media is utilized, the plug is removed, and the flush supply and return lines are connected to the required ports.

Figure 4:
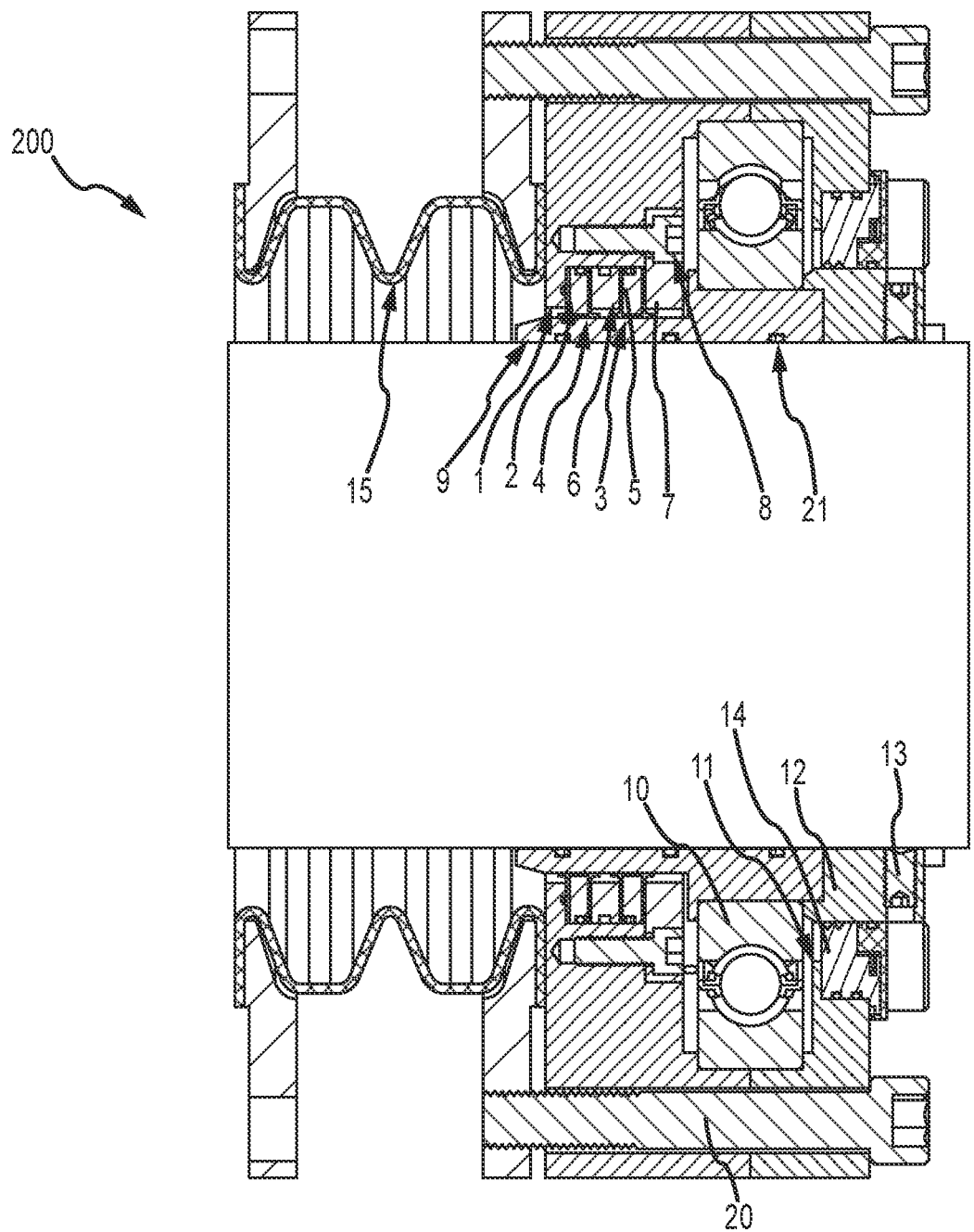
FIG. 4 shows a cross-sectional view of a 3D seal assembly of the 3D seal assembly of FIG. 1 in additional detail.

FIG. 4 is a cross-sectional view of another 3D seal assembly 200, which is similar to the 3D seal assembly 100 described above, but with a different configuration in some aspects. 3D seal assembly 200, as well as 3D seal assembly 100 above, both have sleeves 9 with axially extending portions forming a running surface for the lip seal assembly 114. The thickness of the sleeve 9 about this portion is relatively thick compared to conventional 3D seal assemblies.

Figure 5:
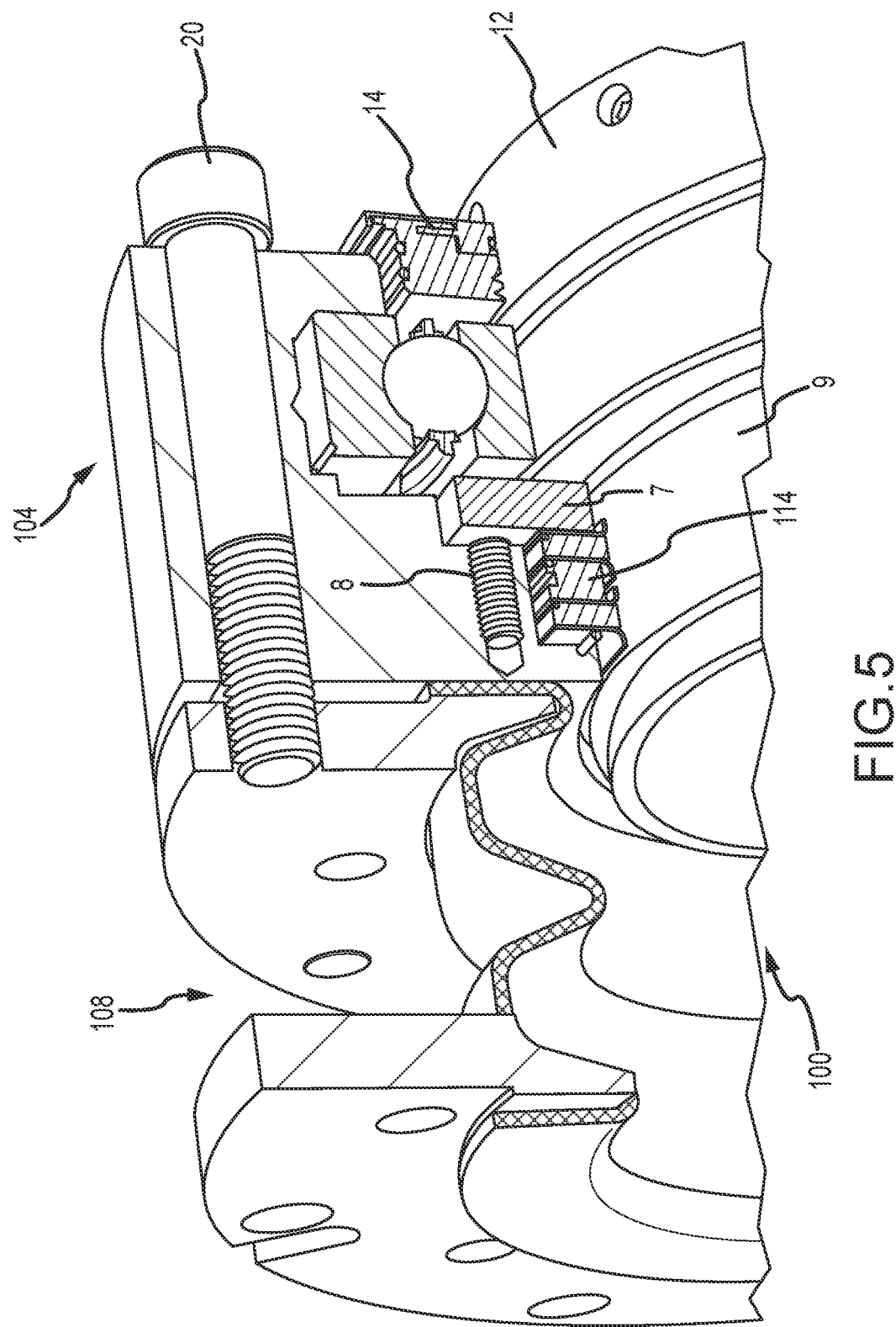
FIG. 5 shows a cut-away perspective view of the 3D seal assembly consistent with the technology of the present application.

FIG. 5 shows a cut-away perspective view of a portion of the 3D seal assembly 100.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A 3D seal assembly comprising, a rotational assembly comprising:
    a sleeve having an axially extending bore having an inner surface that has a size to receive a shaft;
    a collar having an axially extending bore having an inner surface that has the size to receive the shaft and aligned with the axially extending bore of the sleeve, wherein the size of the sleeve to receive the shaft and the size of the collar to receive the shaft are the same; and
    a fastener coupling the sleeve and the collar;
a stationary assembly comprising:
    a housing having an annular recess in a radially inward surface of the housing;
    an annular lip seal assembly sized to fit in the annular recess, the annular lip seal assembly comprising a plurality of seal elements and at least one spacer interspaced between each of the plurality of seal elements; and
    a retention plate coupled to the housing with a compression fastener, wherein the retention plate compresses the annular lip seal assembly.

2. The 3D seal assembly of claim 1 wherein the housing comprises an inboard housing and an outboard housing coupled by a fastener.

3. The 3D seal assembly of claim 2 comprising a bearing isolator between the outboard housing of the stator and the collar of the rotor.

4. The 3D seal assembly of claim 1 comprising an expansion joint coupled to the inboard housing.

5. The 3D seal assembly of claim 4 wherein the expansion joint comprises a bellows having flanged connection plates on opposed ends.

6. The 3D seal assembly of claim 1 wherein the rotational assembly and stationary assembly are coupled by a bearing.

7. The 3D seal assembly of claim 1 wherein the plurality of seal elements each comprise a radially extending portion, a bend, and an axially extending portion.

8. The 3D seal assembly of claim 7 wherein each of the axially extending portions extend in the same direction.

9. The 3D seal assembly of claim 7 wherein at least one of the axially extending portions extends in a direction different from at least another of the axially extending portions.

10. The 3D seal assembly of claim 1 wherein the plurality of seal elements are formed from polytetrafluoroethylene (PTFE), rubber, silicone, other fluoropolymers, of combinations thereof.

11. The 3D seal assembly of claim 1 wherein the at least one spacer comprises glass filled PTFE.

\* \* \* \* \*